United States Patent Office 3,170,803
Patented Feb. 23, 1965

3,170,803
PREPARATION OF DEHYDRATED FOOD PRODUCTS
Arthur I. Morgan, Jr., and Sigmund Schwimmer, Berkeley, Calif., assignors to the United States of America as represented by the Secretary of Agriculture
No Drawing. Filed Feb. 19, 1962, Ser. No. 174,317
8 Claims. (Cl. 99—199)
(Granted under Title 35, U.S. Code (1952), sec. 266)

A non-exclusive, irrevocable, royalty-free license in the invention herein described, throughout the world for all purposes of the United States Government, with the power grant sub-licenses for such purposes, is hereby granted to the Government of the United States of America.

This invention relates in general to the preparation of dehydrated foods and has among its objects the provision of dehydrated foods of enhanced flavor. Further objects and advantages of the invention will be evident from the following description wherein parts and percentages are by weight unless otherwise specified.

It has long been recognized that in conventional methods of preparing dehydrated foods there occurs almost invariably, a loss of natural flavor. A primary cause of this flavor reduction is that during the course of the production of the dehydrated food, heat is applied to the foodstuff. Heating may be applied during the actual dehydration procedure or during such preliminary procedures as blanching, cooking, peeling by application of steam or hot water, etc. In any event, application of such heating programs causes flavor loss by decomposition or vaporization of flavor principles or by inactivation of enzyme systems responsible for the development of flavor.

It has recently been demonstrated that the flavor of dehydrated foods can be enhanced if they are rehydrated in the presence of certain enzyme preparations. It is postulated that the enzyme acts upon flavor precursors present in the dehydrated product, forming natural flavor. In a sense, the enzyme preparation may be considered as developing the latent flavor present in the dehydrated product. Such enzymes may therefore be termed as flavor-developing enzymes.

A disadvantage of the procedure outlined above is that it requires the use of purified enzyme preparations. These substances are made from fruit or vegetable materials and require considerable manipulation, such as extraction with organic solvents, precipitations, centrifugations, and other mechanical or chemical treatments. Because of these cumbersome procedures the process in question is expensive and offers problems from the standpoint of compliance with regulations governing the wholesomeness of food products. Another disadvantage of this known method is that the enzyme preparation does not contain the various flavor-developing enzymes in the same proportions in which they existed in the natural tissue. As a result, when the enzyme preparation is used to restore flavor, one obtains a predominant note or aspect of the over-all flavor rather than obtaining the complete pattern of the natural flavor.

By proceeding in accordance with the invention, the disadvantages outlined above are completely obviated. In the process of the invention, enzyme preparations are not used and there is no need for the cumbersome and expensive manipulations advocated in the prior art.

A typical embodiment of the invention involves the preparation of dehydrated foods which exhibit enhanced natural flavor when prepared for consumption. These novel products contain two distinct ingredients as set forth below:

*Ingredient A.*—This ingredient, used in major proportion, is a dehydrated food prepared by conventional methods. In the preparation of this material the natural produce has been subjected to substantial heating and as a consequence the dehydrated material is deficient in natural flavor. This material might be described as one which contains a flavor precursor or latent natural flavor. This ingredient might also be described as a dehydrated food which has been prepared by a process wherein enzyme-destructive heating has been applied to the food during the course of its processing.

*Ingredient B.*—This ingredient, used in minor proportion, is also a dehydrated food but of characteristics totally different from that of Ingredient A. Thus Ingredient B is a dehydrated food which has been prepared by a process wherein no enzyme-destructive heating is applied to the food during the course of its processing. Typically, Ingredient B is prepared from natural produce—for example, raw fruit, raw vegetables, raw meat, raw milk, or other food material containing active enzymes—by subjecting it to freeze drying. This ingredient, not having been subjected to enzyme-inactivating heating programs, contains an essentially full complement of the enzymes appropriate to the produce in question. As a consequence, Ingredient B can be considered to contain the specific enzymes required to convert the latent flavor of Ingredient A into patent flavor. Thus, when the product of the invention, containing Ingredients A and B in admixture, is rehydrated for use, the desired natural flavor will be developed in the reconstituted product.

The simplicity of the technique of the invention is evident from the above description. Preparation of Ingredient A is simply an application of standard dehydrating methods and preparation of Ingredient B is simply an application of the lesser-used but well known freeze-drying method. Once Ingredients A and B are provided, they merely need be mixed together to provide the novel product of the invention. It is recognized that preparation of Ingredient B requires application of a relatively expensive dehydration method, namely, freeze-drying. However, it is to be emphasized that this ingredient is used in a minor proportion. Consequently, the cost of preparation of Ingredient B is a minor influence on total cost. Moreover, despite the simplicity of the present technique, it is equally as effective as prior procedures using purified enzyme preparations and completely obviates any problems concerning wholesomeness of the products. Moreover, since Ingredient B is prepared without applying any enzyme-isolating technique, it contains the full complement of enzymes as needed for restoration of the complete pattern of natural flavor.

Although the process of dehydrating foods by freeze-drying is well known, it may be of interest to note that in this process the natural produce is frozen, then subjected to vacuum until it is dried to a self-preserving level. Usually, to expedite sublimation of ice during the process, heat is applied to the material under vacuum. However, the degree of application of heat is limited to that required to supply the heat of sublimation rather than to raise the temperature of the material above its freezing point.

The proportions of Ingredients A and B which are blended together to yield the product of the invention, may be varied depending on such factors as the level of flavor retained in Ingredient A, the level of flavor desired in the product, the effectiveness of the enzymes in Ingredient B as regards their ability to develop the latent flavors in Ingredient A, etc. In all cases only a minor proportion of Ingredient B is needed because the restoration of flavor is essentially a catalytic process. In general, we use Ingredient B in a proportion of about from 0.1 to 10 parts thereof per 100 parts of Ingredient A. In many cases, a proportion of about one part Ingredient B per 100 parts Ingredient A gives excellent results.

The process of the invention is of wide applicability and may be applied to foods of all kinds, typical examples thereof being fruits such as apples, pears, peaches, plums, apricots, cherries, strawberries, raspberries, grapes, bananas, oranges, lemons, limes, pineapple, grapefruit; vegetables such as cabbage, lettuce, carrots, beans, peas, beets, asparagus, turnips, broccoli, spinach, squash, onions, celery, corn, tomatoes, potatoes, sweetpotatoes, watercress, etc.; meats such as fish, chicken, beef, veal, lamb, pork, etc.; lacteal products such as milk, cheeses, buttermilk, whey, non-fat milk, ice-cream mixes; cereal products such as extracts of grains or slurries of cereal material derived from wheat, barley, malted barley, rice, or corn; products such as corn syrups, sorghum syrups, malt syrups, malt extract; coffee; tea; chocolate; maple sap or syrup; honey; etc. In the preparation of either of Ingredients A or B the natural produce may be in solid form or may be in liquid form such as juices, purees, pastes, soups, extracts, pulps, or the like.

Ordinarily in preparing the products of the invention, Ingredients A and B are both prepared from the same kind of food product. For example, both are prepared from tomato juice, orange juice, cabbage, or whatever food is selected. However, it is possible to prepare one ingredient from one kind of produce and the other ingredient from a different but related kind of produce. The point here is to select ingredients so that the enzyme components of Ingredient B will have the ability to bring out the latent flavor contained within Ingredient A. An example in this regard is the use of orange as Ingredient A and lemon, lime, or grapefruit as Ingredient B. Another example is the use of cabbage as Ingredient A and radish, broccoli, or turnip as Ingredient B. However, although such combinations are possible, it is usually preferred for best results and for accurate definition of flavor to employ the same kind of produce for both ingredients.

In the preparation of Ingredient A, any of the conventional dehydration techniques can be used. Typical of these methods are spray drying wherein the liquid food is atomized into a current of hot air. Other techniques involve contacting the food with currents of hot air while the food is maintained on trays or a mesh belt. In a preferred modification of the invention Ingredient A is prepared by the foam-mat drying technique disclosed by Morgan et al., Patents 2,934,441, 2,955,046, 2,955,943, 2,967,109, and 2,976,158, and Ginnette et al., 2,981,629, as this technique combines efficient and rapid moisture evaporation together with production of extremely porous products which display very rapid rehydration characteristics. Another advantage of using the foam-mat method for the preparation of Ingredient A is that the high degree of porosity of the products yielded by the foam-mat procedure provides optimum conditions for contact with the enzymes (derived from Ingredient B) when the composite product of the invention is reconstituted.

The preferred method of preparing Ingredient A (by the foam-mat drying technique) is described as follows:

The food in question is first reduced to a liquid state, for example, by applying such unit operations as extraction with water, comminution, pressing, reaming, cooking in water, etc. The liquid is then formed into a foam which is then dehydrated at atmospheric pressure in a current of hot air. The liquid food to which the process is applied need not be a true solution but may contain suspended matter entirely or in addition to dissolved matter. The procedure in question is thus generically applicable to the dehydration of any liquid, this term being used in the sense of including any type of material which is capable of flowing.

In preparing a foam from the liquid to be dried, it is required that the liquid have sufficient body to produce a stable foam. In most cases this requirement is met when the liquid contains so much suspended and/or dissolved solids that it has a thick consistency like that of a syrup, sauce, or paste. Thus, depending on the character of the liquid, it may be necessary to concentrate it by evaporation of water—or other conventional concentration technique—to increase its body. For example, ordinary juices such as orange juice and tomato juice are too thin to form stable foams. Accordingly, the juices are first concentrated to a level of at least about 20% or more, preferably to such an extent that they have a sauce-like or pasty consistency. Ordinary milk is another example of a substance which needs to be concentrated to build up its body prior to foaming it. In cases where the liquid is to be increased in body, this is generally accomplished by removal of water. However, other techniques can be used in place of, or in conjunction with, such techniques. For example, the consistency of juices, purees, and the like, can be increased by application of homogenization or colloid milling. Another plan is to add bodying agents such as dextrins, starch, pectin, algin, or other natural or synthetic gums. On the other hand, such materials as molasses, honey, corn syrup, starch pastes, and the like, already have sufficient body that no increase in solids content is needed. Moreover, some materials may require dilution with water to give them proper liquid characteristics. For example, in applying the process to such relatively high-solids materials as pulped raisins, dates, figs, mashed cooked potatoes, or the like, it is generally necessary to add some water to the pulp so that it will flow more readily and will be adaptable to incorporation of a gas to form a foam. It will be evident to those skilled in the art from the above explanation that in any specific instance the liquid to be dehydrated is to be adjusted to a thick, more or less pasty consistency by conventional techniques so that it will be amenable to forming a stable foam.

In preparing the foam, a gas is incorporated into the liquid by conventional techniques. Although air is generally used as the gas it is by no means essential to use it and any gas may be employed. In preparing edible products, non-toxic gases are used such as air, nitrogen, carbon dioxide, nitrous oxide, helium, propane, n-butane, isobutane, dichlorodifluoromethane, trichloromonofluoromethane, or monochlorotrifluoromethane. Incorporation of the gas into the liquid may be accomplished in any of the conventional methods used, for example, in aerating ice cream, salad dressings, etc. A simple method where air is to be incorporated is to whip the liquid with a rotating wire whip which beats air into the mixture. For best results it is preferred that the gas bubbles be dispersed uniformly throughout the foam and be of uniformly small size, i.e., about 100 microns or less in diameter. Such techniques as homogenizing may be employed to increase uniformity and decrease the size of the gas bubbles. Also, the mixture may be cooled during the foaming operation to promote formation of a stable foam. Where cooling is used, any temperature below room temperature may be applied provided it is not low enough to freeze the foam. The amount of gas incorporated into the liquid may be varied widely. Generally, it is preferred to incorporate enough gas to increase the volume of the liquid 1.5 times, more preferably about 2 to 3 times. It is evident that the greater the volume increase the more bulky will be the final product because of a greater proportion of volume of voids to total volume. In some cases it may not be desired to produce a too-bulky end product (because of increased packaging costs) and in such case, the volume increase may be limited, say, to not over 5 times. However, if bulk of the final product is not a consideration, the volume increase may be as much as desired, up to, say, 10 or 20 times original volume of the liquid. It is evident from the above that the volume increase achieved in foaming is not a critical item and may be varied as desired under particular circumstances.

In many instances it is not feasible to form a stable foam merely by incorporation of a gas into the liquid. Accordingly, it is preferred to add to the liquid before or during foaming, a minor proportion of a foam-stabilizing agent. The chemical nature of the foam-stabilizing agent is of no moment to the operability of the invention as long as the agent possesses the ability to stabilize foams. Various examples of suitable agents are listed hereinafter. The proportion of foam-stabilizing agent will vary depending on the properties of the liquid, the properties of the agent in question, etc. In general, the proportion of the agent may vary about from 0.1 to 5.0% by weight based on the weight of solids in the liquid. It is naturally desirable to use the lowest proportion of foam-stabilizing agent compatible with production of a stable foam. Thus in any particular case, pilot trials may be conducted with different proportions of stabilizing agent and noting the stability of the foam after incorporation of gas. The stability of the foams may be easily determined by allowing the test batches of foam to stand at room temperature. A suitably stable foam is one which will retain its volume without any separation of gas from liquid for at least ½ hour, preferably at least one hour, when allowed to stand at room temperature.

The foam stabilizer may be a surface-active agent or a hydrophilic colloid or a mixture of the two.

Typical examples of classes of surface-active agents and individual compounds which may be used are listed below:

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula—

$$R—CO—(OC_2H_4)_n—OH$$

where R—CO is the acyl radical of a fatty acid such as lauric, palmitic, oleic, stearic, etc. and $n$ has a value from 6 to 60.

Condensation products of ethylene oxide with long-chain aliphatic alcohols, i.e., compounds of the formula—

$$R—(OC_2H_4)_n—OH$$

wherein R is the hydrocarbon radical of a long-chain alcohol such as dodecyl, tetradecyl, hexadecyl, octadecyl, oleyl, etc. and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the sodium alkyl ($C_8$–$C_{20}$) benzene sulphonates. Typical in this class are sodium dodecyl benzene sulphonate and sodium hexadecyl benzene sulphonate.

Alkyl esters of sulphosuccinic acid, for example, the sodium salt of dioctyl sulphosuccinate.

Sulphonated or sulphated fatty acid esters or amides, i.e., compounds of the types:

$$RCO—O—CH_2—CH_2—SO_3Na$$

$$RCO—NH—CH_2—CH_2SO_3Na$$

$$RCO—O—CH_2—CH_2—OSO_3Na$$

and $$RCO—NH—CH_2—CH_2—OSO_3Na$$

wherein RCO represents the acyl radical of a long-chain fatty acid such as lauric, myristic, palmitic, stearic, oleic, etc.

Condensates of ethylene oxide and alkyl phenols, that is, compounds of the type $R—C_6H_4—(OC_2H_4)_nOH$, wherein R represents an alkyl radical containing 6 to 20 carbon atoms and $n$ has a value of about 6 to 30.

Salts of bile acids, for example, bile salts as obtained from animal sources or alkali metal salts of individual bile acids such as cholic acid, dehydrocholic acid, desoxycholic acid, hyodesoxycholic acid, dehydrodesoxycholic acid, dehydrohyodesoxycholic acid, lithocholic acid, glycocholic acid, or taurocholic acid.

It will of course be appreciated that the particular surface-active agent for use in the process of the invention will be selected according to the use which is to be made of the final product. Thus, where the product is intended for edible purposes, the surface-active agent selected will be one which is edible or at least which may be ingested without adverse effects. Thus, for the production of edible products, we prefer to use surface-active agents of the class of fatty acid esters of sorbitan or mannitan, agents of the class of polyoxyethylene sorbitan (or mannitan) fatty acid esters, agents of the class of polyoxyethylene derivatives of higher fatty acids, e.g., polyoxyethylene monostearate, agents of the class of sucrose mono- or di-esters with higher fatty acids, agents of the class of glycerol monoesters of higher fatty acid esters, agents of the class of bile salts, etc.

Generally, it is preferred to employ surface-active agents in order to stabilize the foam for dehydration since these agents are especially effective even when employed in very small proportion, for example, from 0.1 to 2% by weight based on the weight of solids in the liquid. However, the foam stabilizer may be a mixture of a surface-active agent and a hydrophilic colloid or may be a hydrophilic colloid alone.

Typical examples of hydrophilic colloids which may be employed are: albumin, dried egg-white, dried glucose-free egg-white, gelatin, sodium gluten sulphate, sodium gluten phosphate, polyvinylpyrrolidone, polyvinyl alcohol, soluble starch, sodium carboxymethyl cellulose, methyl cellulose, agar, gum tragacanth, gum arabic, gum acacia, gum karaya, carragheen, alginic acid, sodium alginate, pectin, dextran, dextrin, sodium carboxymethyl starch, sodium carboxymethyl amylose, sodium carboxymethyl amylopectin, pentosans, etc. Generally, it is preferred to employ as the hydrophilic colloid, water-dispersible proteins such as albumin, dried-egg white preparations, or the like.

Having prepared a foam as above described, it is subjected to dehydration to produce a porous dry product. To enhance the surface of the foam exposed to the drying conditions, it is preferred that it be in the form of a relatively thin layer, for example, an elongated sheet or strings, rods, or other filamentary shapes. The foam may be shaped into such structures by application of conventional extrusion procedures. Generally, the foam is formed into bodies having a thickness of about 0.01 to 0.5 inch. The foam may then be dehydrated while supported on trays or equivalent supports, perforated or imperforate. In a preferred modification, the foam is formed into a cratered or perforated mat. This may be accomplished as disclosed in the U.S. patent of L. F. Ginnette et al., No. 2,981,629 of April 25, 1961. To this end, the foam is spread as a mat on a perforated sheet. The thickness of the mat is generally about from 0.01 to 0.5 inch. In applying the foam onto the perforated sheet, the applicator means may be one that deposits the foam only onto the top surface of the sheet. As the perforated sheet, various structures may be used. A preferred structure is the ordinary perforated sheet metal of commerce which is provided with circular apertures in staggered rows. Typically, such sheets may have holes from about 1/16" to 1/2" in diameter, spaced on centers to provide an open area of anywhere from 20 to 60% of the total area of the sheet. The sheet bearing the mat of foam is then subjected to a blast of air or other gas directed upwardly through the perforations in the sheet. This blast of gas causes the portions of foam in and overlying the perforations to be upwardly and laterally away from the perforations toward imperforate sections of the supporting surface. The net result is that the layer of foam is now perforated, the perforations in the mat of foam corresponding with the perforations in the supporting surface. Because of the stiff nature of the foam, this new configuration is stable and is retained during subsequent treatment. The perforated foam is in prime condition for dehydration because its surface area has been multiplied many times. Depending on such factors as the depth of the mat of foam and the structure of the supporting surface, particularly the proportion of free space therein, the surface area may be multiplied anywhere from 5 to 25 times, or more. Having prepared this perforated mat of foam, it is subjected to dehydration as described herein.

After the foam has been shaped into a desired configuration, as explained above, it is subjected to dehydration. Various methods and equipment can be employed for this purpose. For example, the foam may be subjected to vacuum. During application of the vacuum, heat may be applied, for example, by radiant heaters which direct their energy to the foam, to the support carrying the foam, or to both at the same time. As with other dehydration procedures disclosed below, the amount of heat applied is limited to avoid any substantial reduction in the volume of the foam. Although vacuum dehydration may be used it is not preferred because of the expense of the equipment and the high cost of maintaining the vacuum. Thus, we prefer to conduct the dehydration by applying a hot gas to the foam under normal (atmospheric) pressure. Generally, air is used as the gaseous medium for this dehydration but it is by no means essential to use it. Thus, if desired, oxygen-free gases may be used to avoid any possibility of oxidation of the product. In such event one may use inert gases such as nitrogen; carbon dioxide; helium; or combustion gases resulting from the burning of coal, coke, petroleum oils, or more preferably, natural gas. It is, of course, obvious that where food products are being treated the gaseous medium should be non-toxic.

In conducting the dehydration by application of a heated gas, one may use, for example, conventional cabinet driers wherein trays bearing the foam are subjected to a current of hot gaseous medium. Continuous dehydrators of various types may be used, for example, driers equipped with mechanical drive arrangements to move a supporting means—individual trays or a continuous belt—bearing the foam through the apparatus while it is contacted with hot gas. Various systems may be used for applying the gas to the foam, for example, the gas stream may be applied in concurrent, countercurrent, or cross-wise directions. In drying a perforated mat of foam, it is preferred to force the gas stream through the perforations in the mat of foam. Systems employing a compartmentalized dehydrator may be used to provide different gas temperatures at different stages as the material is dehydrated. Such systems are useful to obtain a high rate of moisture evaporation (by use of a high gas temperature) while the material is quite wet and the danger of overheating the product is remote. In succeeding stages the temperature of the gas may be reduced to avoid overheating as the product becomes drier and its temperature tends to approach that of the gas stream.

Generally, the temperature of the gaseous medium may range from about 100 to 300° F. Within this range the temperature may be varied in individual cases depending on such factors as the properties of the material being dried, the through-put, the rate of drying desired, and so forth. Generally, it is desired to employ as high a temperature as possible to achieve a rapid rate of dehydration. However, the temperature should not be so high as to overheat the product or cause the foam to decrease substantially in volume. Also, if the foam is in the form of a perforated mat, it should not be overheated to the extent of causing it to sag into and plug the perforations. To ensure such results, the foam may be kept under observation during dehydration and the temperature of the gas reduced if the foam shows a tendency to decrease in volume or sag to any substantial extent. It is impossible to set forth numerical temperature limits in this connection because the stability of the foam will depend on many factors including efficacy of the foam-stabilizing agent used, temperature of the foam, moisture content of the foam, size of gas bubbles in the foam, rate of heating of the foam, softening temperature of the product, etc. However, in any particular instance the gas temperature may be controlled in accordance with visual observation and this system of control affords a more reliable guide than could numerical limits. Generally, the dehydration is continued until there is formed a solid product containing at most about 5% moisture.

After Ingredient A has been prepared as above described, it is blended with a minor proportion of Ingredient B to yield the product of the invention.

In a special embodiment of the invention, Ingredient B is prepared by a modification of the foam-mat process described above. In this technique, a liquid food is formed into a foam exactly as described in connection with the foam-mat process explained above. This foam is then frozen and while frozen subjected to vacuum until it is dry. A special advantage of this procedure is that thereby Ingredient B is obtained in an extremely porous condition so that it displays very rapid rehydration characteristics. Another advantage is that since the food material is in the state of a foam the efficiency of dehydration is increased in that ice particles throughout the material are directly exposed to the low pressure atmosphere and hence sublimation can take place more rapidly than in systems wherein the ice particles are enmeshed in a dense mass. A typical method of preparing Ingredient B by freeze-drying a foam is given in Example V.

The invention is further demonstrated by the following illustrative examples:

*Example I*

Ingredient A in this case was commercial dehydrated cabbage. Ingredient B was prepared by chopping fresh cabbage, freezing it in a blast freezer to about −20° F. and subjecting it to vacuum until dry. The product was prepared by admixing 200 parts Ingredient A with 2 parts of Ingredient B.

As a test, the product and a sample of Ingredient A by itself were each put into water (using 20 parts dehydrated material in 120 parts water), held at room temperature for one hour, then tasted. It was found that the product had a more natural cabbage flavor than did Ingredient A alone.

*Example II*

Ingredient A was commercial dehydrated mashed potato. Ingredient B was prepared by mincing fresh potato, freezing it in a blast freezer and holding it under vacuum until dry. The product was prepared by admixing 100 parts of Ingredient A with one part of Ingredient B.

As a test, the product and a sample of Ingredient A by itself were each put into water (using 20 parts dehydrated material in 95 parts water), held at 37° C. for 3 hours, then tasted. It was found that the product had a more natural potato flavor than did Ingredient A alone.

*Example III*

Ingredient A was dehydrated tomato juice prepared by the foam-mat drying method as disclosed in Morgan et al. Patent 2,967,109. Thus, to 100 parts of tomato juice concentrate (30% solids) was added one part of glycerol monostearate. This material was whipped into a foam having a density of about 0.4 gram/ml. The foam was extruded through a die in the form of ⅛ inch diameter spaghetti and subjected to contact with a current of air at 160° F. for 12 minutes and then to a current of air at 130° F. for 3 minutes. The porous dehydrated foam contained about 3% moisture.

Ingredient B was prepared by mincing fresh tomatoes, freezing them in a blast freezer and subjecting the frozen material to a vacuum until dry.

The product was made by blending 100 parts of Ingredient A with one part of Ingredient B.

As a test, the product and a sample of Ingredient A by itself were reconstituted, using about 10 parts dehydrated material per 100 parts water and holding at 37° C. for 3 hours. It was found that the product had more of a fresh-tomato taste than did Ingredient A.

*Example IV*

Ingredient A was dehydrated grapefruit juice prepared by the foam-mat drying method disclosed in Morgan et al. Patent 2,967,109.

Ingredient B was prepared by peeling and slicing fresh grapefruit, freezing the grapefruit slices in a blast freezer, and subjecting the frozen material to vacuum until dry.

The product was prepared by blending 1,000 parts of Ingredient A with one part of Ingredient B.

To provide a comparative test, the product and a sample of Ingredient A by itself were reconstituted, using about 0.1 part of dehydrated material per part of water and holding the reconstituted juice at 37° C. for 3 hours. It was found that the juice prepared with the product had more natural grapefruit flavor than did the juice prepared with Ingredient A by itself.

*Example V*

(1) Orange juice was concentrated under vacuum to 55% solids content. One hundred parts of the concentrate were mixed with 0.4 part of solubilized soya protein and 0.1 part of low-viscosity methyl cellulose. The mixture was beaten in air to produce a foam having a density of 0.35 g. per ml.

(2) One lot of the foam prepared as described above was spread out as ⅛ inch diameter extrusions on a belt moving through an air stream of 200 ft. per minute velocity. The air temperature decreased from 180° F. to 130° F. during a 12-minute drying period. The crisp, dry extrusions containing 3% moisture were collected and crumbled. This was Ingredient A for the purpose of this example.

(3) Another lot of the foam prepared as described in part 1 above was spread on trays, then frozen in a blast freezer. The frozen foam was then placed in a vacuum drier wherein, while in the frozen state, it was exposed to a pressure of about 0.2 mm. of mercury until its moisture content was about 3%. This material was Ingredient B for the purpose of this example.

(4) One hundred parts of Ingredient A were then blended with one part of Ingredient B.

*Example VI*

Ingredient A was prepared by cutting fresh carrots into ¼ inch dice, blanching the dice with steam, then exposing the dice to a current of hot air at about 150° F. until the carrots were dehydrated.

Ingredient B was prepared as follows: Fresh carrots were crushed to form a puree. This puree was formed into a foam by adding about 1% of glycerol monostearate and whipping air into the mixture. The foam was frozen, then subjected to vacuum until dry while maintained in the frozen state.

One hundred parts of Ingredient A were then blended with one part of Ingredient B.

Having thus described the invention, what is claimed is:

1. The method of preparing a dehydrated food product of improved natural flavor which comprises (1) dehydrating a food with the application of enzyme-destructive heating to prepare a dehydrated food containing latent natural flavor, (2) dehydrating a food in the absence of enzyme-destructive heating to prepare a dehydrated food containing flavor-developing enzymes, and (3) admixing a major proportion of dehydrated food 1 with a minor proportion, effective for flavor restoration, of dehydrated food 2.

2. The method of preparing a dehydrated food product of improved natural flavor which comprises (1) dehydrating natural produce with the application of enzyme-destructive heating to prepare a dehydrated food containing latent natural flavor, (2) dehydrating natural produce in the absence of enzyme-destructive heating to prepare a dehydrated food containing flavor-developing enzymes, and (3) admixing a major proportion of dehydrated food 1 with a minor proportion, effective for flavor restoration, of dehydrated food 2.

3. The method of claim 2 wherein the natural produce is a fruit.

4. The method of claim 2 wherein the natural produce is a vegetable.

5. The method of claim 2 wherein the natural produce is meat.

6. The method of claim 2 wherein the natural produce is milk.

7. The method of preparing a dehydrated food product of improved natural flavor which comprises (1) gasifying a liquid food material and forming it into a stable foam, dehydrating the foam by contact with a current of hot air to obtain a porous dehydrated product containing latent flavor and (2) admixing a major proportion of said product with a minor proportion, effective for flavor restoration, of a dehydrated food containing flavor-developing enzymes which has been prepared by subjecting the food to vacuum while in the frozen state.

8. The method of preparing a dehydrated food product of improved natural flavor which comprises: (1) gasifying a liquid food and forming it into a stable foam, dehydrating the foam by contact with a current of hot air to obtain a dehydrated food containing latent flavor; (2) gasifying a liquid food and forming it into a stable foam, freezing the foam, dehydrating the frozen foam by subjecting it to vacuum while maintaining it in the frozen state to obtain a dehydrated food containing flavor-developing enzymes; and (3) admixing a major proportion of dehydrated food 1 with a minor proportion, effective for flavor restoration, of dehydrated food 2.

References Cited by the Examiner

UNITED STATES PATENTS

| | | | |
|---|---|---|---|
| 2,431,496 | 11/47 | Natelson et al. | 99—71 |
| 2,788,276 | 4/57 | Reich et al. | 99—199 |
| 2,844,476 | 7/58 | Rivoche | 99—199 |
| 2,885,788 | 5/59 | Leviton | 99—201 |
| 2,955,046 | 10/60 | Morgan et al. | 99—206 |
| 2,989,404 | 6/61 | Nelson | 99—204 |

FOREIGN PATENTS 654,722  6/51  Great Britain.

OTHER REFERENCES

Flosdorf, E. W.: "Freeze-Drying," 1949, Reinhold Publishing Co., N.Y., pp. 127, 128 and 130, TP363F4.

A. LOUIS MONACELL, *Primary Examiner*.

ABRAHAM WINKELSTEIN, *Examiner*.